United States Patent [19]
Dammeyer et al.

[11] Patent Number: 5,008,604
[45] Date of Patent: Apr. 16, 1991

[54] DYNAMIC CLIPPER FOR USE IN A VEHICLE GUIDANCE SYSTEM

[75] Inventors: Ned E. Dammeyer, New Bremen; Nick D. Thobe, Celina, both of Ohio

[73] Assignee: Crown Equipment Corporation, New Bremen, Ohio

[21] Appl. No.: 446,502

[22] Filed: Dec. 5, 1989

[51] Int. Cl.⁵ .............................................. G05D 1/00
[52] U.S. Cl. .................................... 318/587; 180/167
[58] Field of Search ........................... 318/580, 587; 364/424.01, 424.02; 180/167, 168

[56] References Cited

U.S. PATENT DOCUMENTS

| | | | |
|---|---|---|---|
| 3,008,532 | 11/1961 | Reed | 318/587 X |
| 3,018,367 | 1/1962 | Mountjoy | 180/168 |
| 3,431,996 | 3/1969 | Giles et al. | 180/168 |
| 3,669,207 | 6/1972 | Fellgett et al. | 180/168 |
| 3,942,087 | 3/1976 | Maisch et al. | 318/587 |
| 4,079,801 | 3/1978 | Dobson | 318/587 X |
| 4,160,488 | 7/1979 | Blakeslee | 318/587 X |
| 4,247,896 | 1/1981 | Schnaibel | 180/168 X |
| 4,855,656 | 8/1989 | Saitoh et al. | 318/587 |

FOREIGN PATENT DOCUMENTS

| | | | |
|---|---|---|---|
| 63-204415 | 8/1988 | Japan | 180/168 |
| 1357920 | 12/1987 | U.S.S.R. | 180/168 |

Primary Examiner—Bentsu Ro
Attorney, Agent, or Firm—Biebel, French & Nauman

[57] ABSTRACT

A dynamic clipper is used in the guidance control circuits of a wire guided vehicle, such as a lift truck, that is guided by a wire laid in floors between storage racks into which an alternating electrical signal is provided to remove the effects of noise pulses. The wire signal is detected by sensor coils carried by the vehicle, and the amplitude of this signal is used as an indication of the distance of the vehicle to the wire. The dynamic clipper includes a first comparator having one input from the sensor coil and the other input from a reference source. All noise signals greater than the reference voltage are removed. The output is then passed to an inverter and then to a second comparator which performs the same function. Thus both the positive and negative going noise pulses greater than the reference are removed from the sensor output signal. The resulting output is then rectified with a full wave rectifier and integrated to provide a direct current reference signal, the magnitude of which is therefore related directly to the proximity of the sensor coil to the buried wire.

11 Claims, 9 Drawing Sheets

DYNAMIC CLIPPER FOR USE IN A VEHICLE GUIDANCE SYSTEM

BACKGROUND OF THE INVENTION

This invention relates to wire guided vehicles, such as lift trucks that are guided by wires laid in floors between storage racks. An electrical signal supplied to the wire is detected by sensor coils carried by the vehicle.

The amplitude of this signal is compared to a reference to provide information concerning the distance of the sensor coil from the wire.

The sensor coils also detect noise from many sources, such as from the contactors, motor controllers, and other electrical components in the lift truck itself, machinery operating in the building, and so forth. Obviously, this noise will degrade the ability of the circuits associated with the sensor coils and can cause errors leading to unstable directional control.

SUMMARY OF THE INVENTION

This invention relates to an apparatus for limiting the effect of noise pulses that are induced into sensor coils positioned to detect the signal radiated from a buried wire.

This invention utilizes a reference voltage against which the voltage output from each sensor coil is compared to limit the output and thus minimize the effects of any noise pulses. The reference voltage is variable, that is, it is a function of the strength of the signal being received by the sensor coil at any given time, and thus allows the output signal to be a truly representative indication of the distance of the coil from the wire carrying the signal. To insure that the system operates properly, a minimum reference signal is provided.

The dynamic clipper of this invention employs a circuit that limits the magnitude of the signal from the sensor coils to a value determined by the reference voltage. Specifically, that circuit includes a first comparator having one input from the sensor coil and the other input from the reference source. This circuit will remove any noise signal greater than the reference voltage. The output is then passed to an inverter and then to a second comparator which performs the same function. Thus both the positive and negative going noise pulses will be clipped or removed from the sensor output signal. The resulting output is then rectified with a full wave rectifier and integrated to provide a direct current reference signal, the magnitude of which is therefore related directly to the proximity of the sensor coil to the buried wire.

Dynamic clipping reduces the amount of filtering required to remove the noise. By clipping the majority of the noise, the filtering required is reduced by an order of magnitude, and thus the response time of the analog circuitry delivering the voltage representing the coil output to the guidance computer is greatly reduced. The resulting improvement in response time allows the vehicle to make correctional changes more rapidly in real time, which means that the vehicle will track closer to the centerline of the wire than with prior art systems.

Accordingly, it is an object of this invention to provide an improved circuit for use in a guided vehicle control system which limits the effect of noise pulses on the signals picked up by a sensor coil; and to provide an improved circuit where clipping the noise reduces the time required to provide an adequately filtered output signal, thus allowing the vehicle to track close to the path of the wire.

It is another object of this invention to provide an improved circuit including means for limiting the effect of noise in a guided vehicle control system, said limiting means including a source of reference voltage, means responsive to the output of the sensing coil for limiting the magnitude of the sensing coil voltage to a value determined by said reference voltage, rectifier means for rectifying the output of said limiting means, and means for integrating the output of said rectifier means to generate said reference voltage, whereby the output of said rectifier means will be closely related to the strength of the signal induced into the sensing coil from the buried wire.

It is a further object of this invention to provide an apparatus for sensing a signal of variable energy inductively coupled into a sensing coil while limiting the effect of noise pulses picked up by the coil, said apparatus including an amplifier for receiving an input signal from the sensing coil and for providing an conditioned signal, means for providing a reference signal, first comparator means, having a first input from said amplifier and a second input, for providing an output signal which substantially reproduces the input signal but which does not exceed said reference signal applied to said second input by more than a predetermined amount, inverter means for inverting the output signal of said first comparator means, second comparator means, having a first input from said inverter means and a second input, for providing an output signal which substantially reproduces the input signal but which does not exceed said reference signal applied to said second input by more than a predetermined amount, a full wave rectifier for rectifying the output of said second comparator means, an integrator connected to the output or said full wave rectifier for providing said reference signal to said second inputs of both said first and second comparator means, whereby the output from said integrator will follow variations in the amplitude of the signal from said sensing coil while ignoring substantially any spurious noise in the input signal.

Other objects and advantages of the invention will be apparent from the following description, the accompanying drawings and the appended claims.

BRIEF DESCRIPTION OF THE DRAWINGS

FIG. 11 is a set of waveform diagrams snowing the signals present at various stages in the dynamic clipper wherein FIG. 11A shows the input signal, FIG. 11B shows the output of the first clipper, FIG. 11C shows the output of the inverter, and FIG. 11D shows the output of the second clipper.

DESCRIPTION OF THE PREFERRED EMBODIMENT

Figure 1:
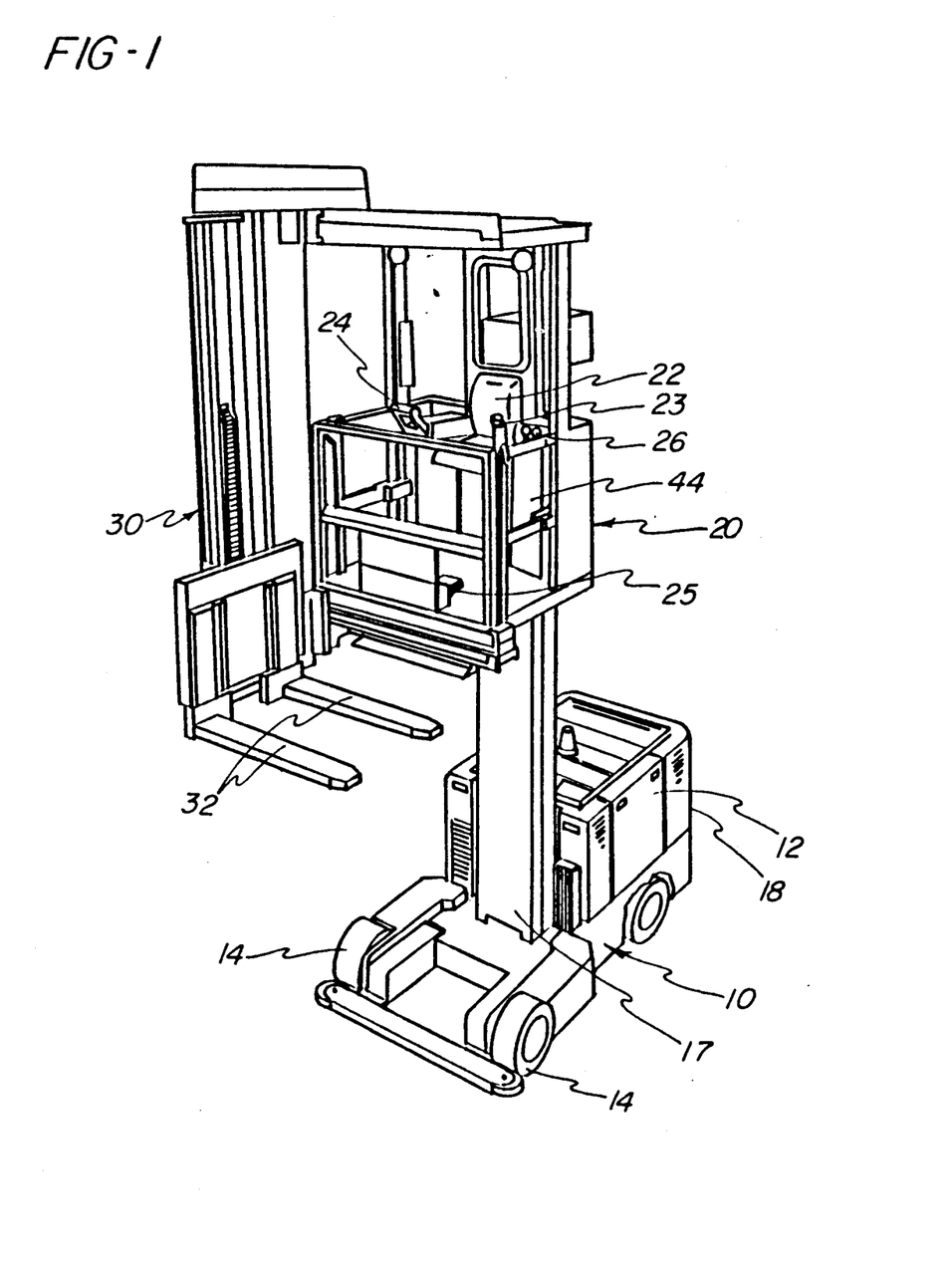
FIG. 1 is perspective view of a turret stock picker which is representative of the type of vehicle that includes automatic guidance.

Referring now to the drawings, and particularly to FIG. 1 which illustrates a forklift truck of the type including a wire guidance system, the truck may include a power unit 10, a platform assembly 20, and a load handling assembly 30.

Figure 2:
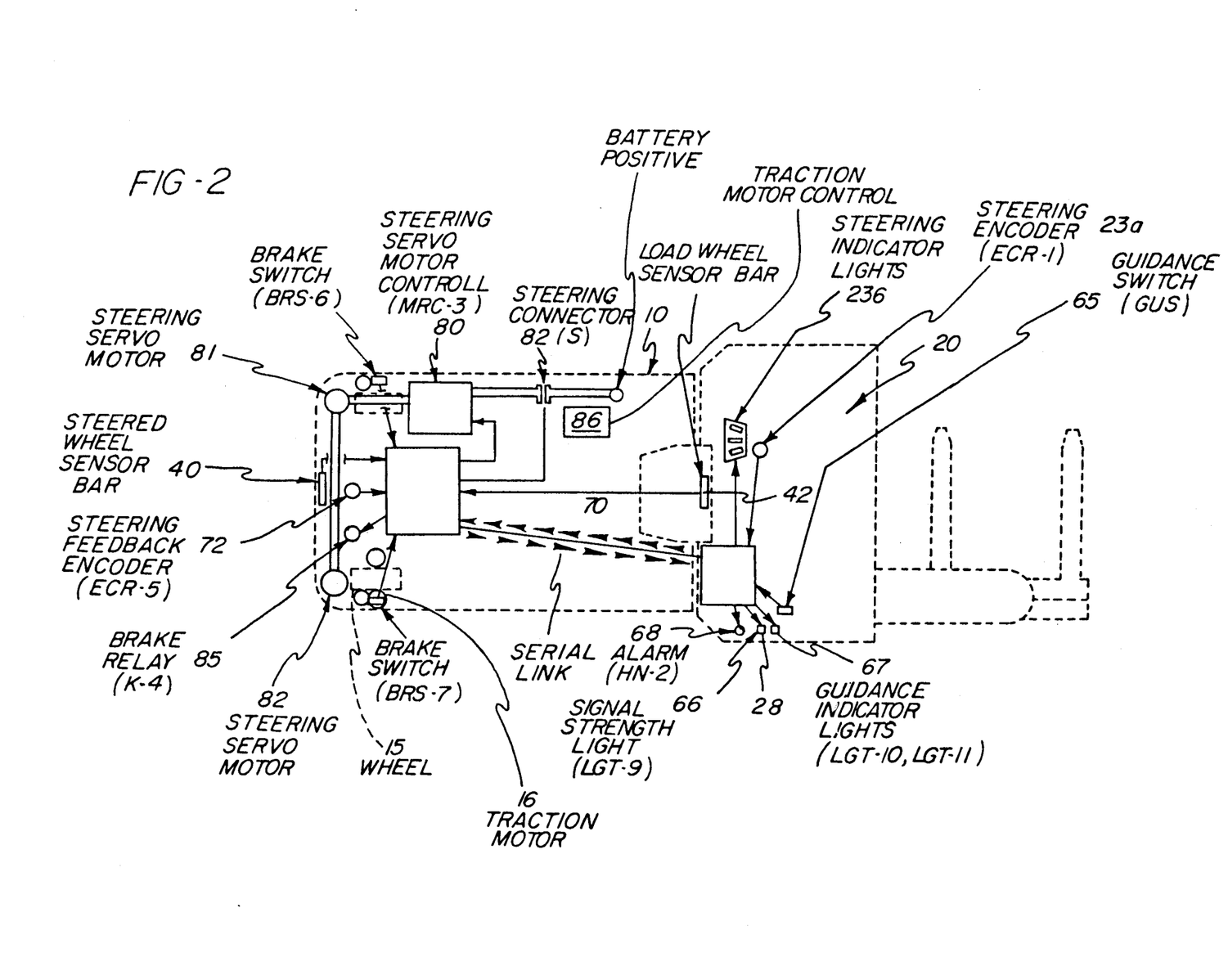
FIG. 2 is a schematic plan view showing some of the major components comprising the vehicle control system.
Figure 3:
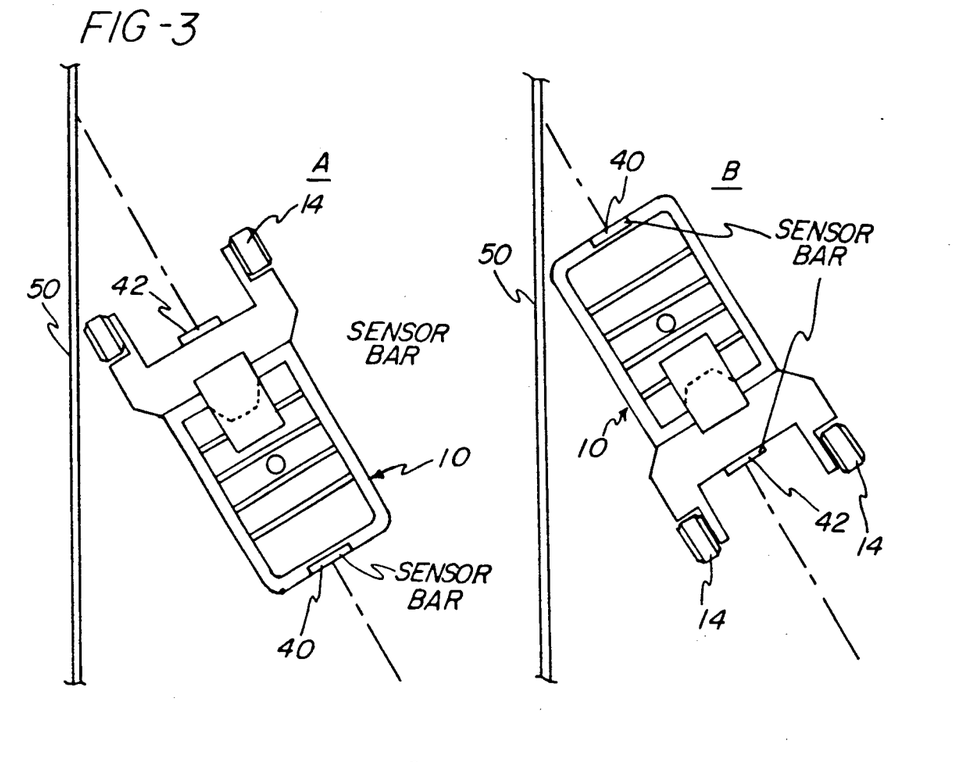
FIG. 3A is a plan view showing a vehicle approaching a buried wire in the forward direction.
FIG. 3B is a plan view showing a vehicle approaching a buried wire in the reverse direction.

The power unit 10 includes a power source, such as a battery unit 12, a pair of load wheels 14 positioned under the platform assembly, a pair of steered wheels 15 (FIG. 2) positioned under the rear end of the power unit 10 with each wheel being driven by a traction motor 16, a mast 17 on which the platform assembly 20 rides, and a power unit electronic control unit 18 (FIG. 2).

The platform assembly 20 includes a seat 22 from which the operator can control a steering tiller 23, traction motor control 24, brake pedals 25 and forklift controls 26. The platform assembly 20 includes an electronics package 28 which is interconnected with the power unit electronics package 18 by means of appropriate electrical cables.

The load handling assembly 30 includes a pair of lift forks 32 which may be raised and lowered, and also rotated relative to the platform assembly by the controls 26.

As illustrated in FIG. 2, the power unit 10 supports two sensor bars 40 and 42. Sensor bar 40 is located between the steerable wheels while the sensor bar 42 is placed between the load wheels 14. Both sensor bars are designed to detect a wire 50 embedded in the floor of the warehouse.

Figure 5:
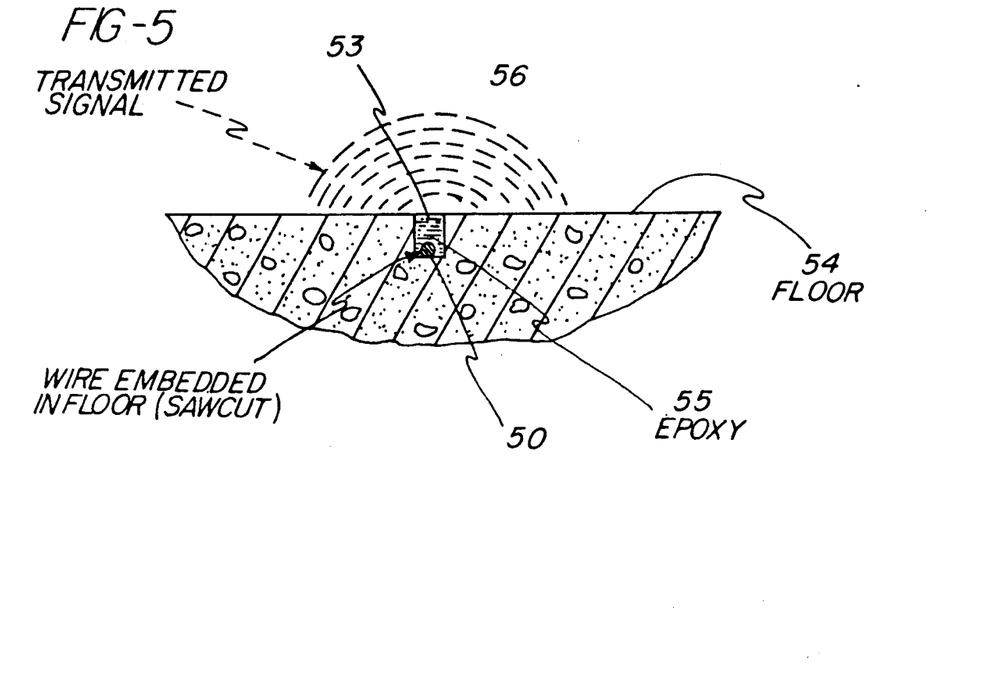
FIG. 5 is an elevational view showing the radiation pattern emanating from a sinusoidal signal carried by a buried wire.
Figure 6:
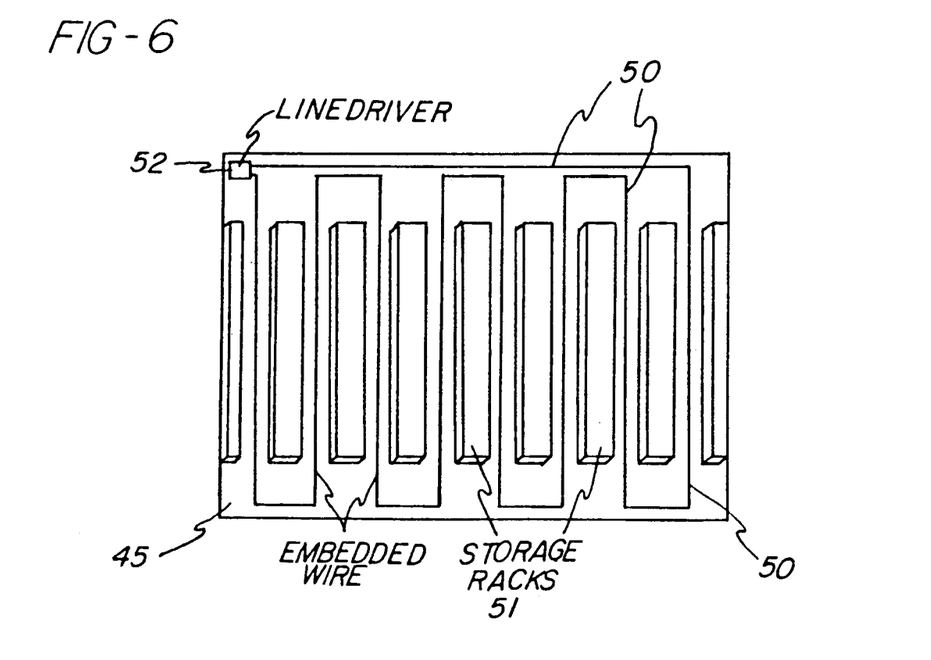
FIG. 6 is a plan view illustrating a buried guidance wire placed between storage racks in a typical warehouse.

As shown in FIG. 6, the embedded wire 50 is placed down the center of the narrow aisles between the storage racks 51 in a warehouse. A line driver 52 causes current in the order of 220 ma. to pass through the wire at a frequency in the range of from 4-12 kHz. As shown in FIG. 5, the wire 50 is embedded in a saw cut 53 made in the floor 54, and it is held in place by epoxy 55 which fills the remainder of the cut after the wire has been placed in the bottom thereof. The wire will radiate a signal, shown by the dashed lines 56 in FIG. 5, which signal may be detected by sensor coils carried by either or both of the sensor bars 40 or 42.

Figure 4:
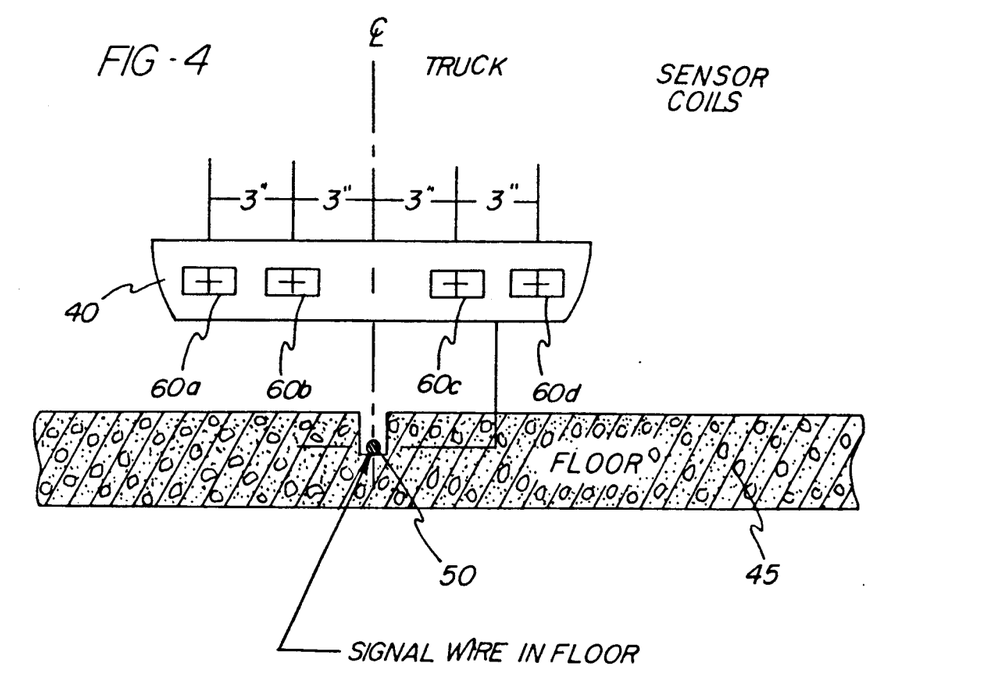
FIG. 4 is an elevational view showing the relationship between a sensor bar that includes four sensor coils relative to a guidance wire buried in a concrete floor.

Referring now to FIG. 4, four sensor coils 60 are carried by each of the sensor bars 40, 42. The axis of each coil is horizontal to the floor 54. Coil 60a is placed six inches to the left of the center line of the sensor bar, coil 60b is three inches to the left, coil 60c is three inches to the right, and coil 60d is 6 inches to the right of the center line. The centers of each coil are a nominal 4 inches above the wire 50. Each coil 60 is approximately 1 inch in length, and ½ inch in diameter.

Referring again to FIGS. 1 and 2, the steering tiller 23, traction motor control 24, brakes 25 and fork lift controls 26, as well as the other controls on the platform assembly, are provided with position sensors, encoders and switches, and signals from these devices are transmitted to the electronic control package 18 located in the power unit 10. For example, the platform assembly 20 includes a steering encoder 23a, steering indicator lights 23b to show the operator which direction the wheels have been turned, a guidance switch 65, a signal strength light 65, guidance indicator lights 67, and an alarm or horn 68.

A serial link 70 electrically connects the platform electronic control package 28 to the power unit electronic control package 18, which also receives further input signals from a steering feedback encoder 72 which indicates the actual position of the steering wheels, the steered wheeled sensor bar 40, the load wheel sensor bar 42, and the brake switch 74. It provides output signals to control the steering servomotors 81 and 82 through a steering motor control circuit 80, a steering contactor 84, a brake relay 85, and a traction motor control circuit 86.

Figure 7:
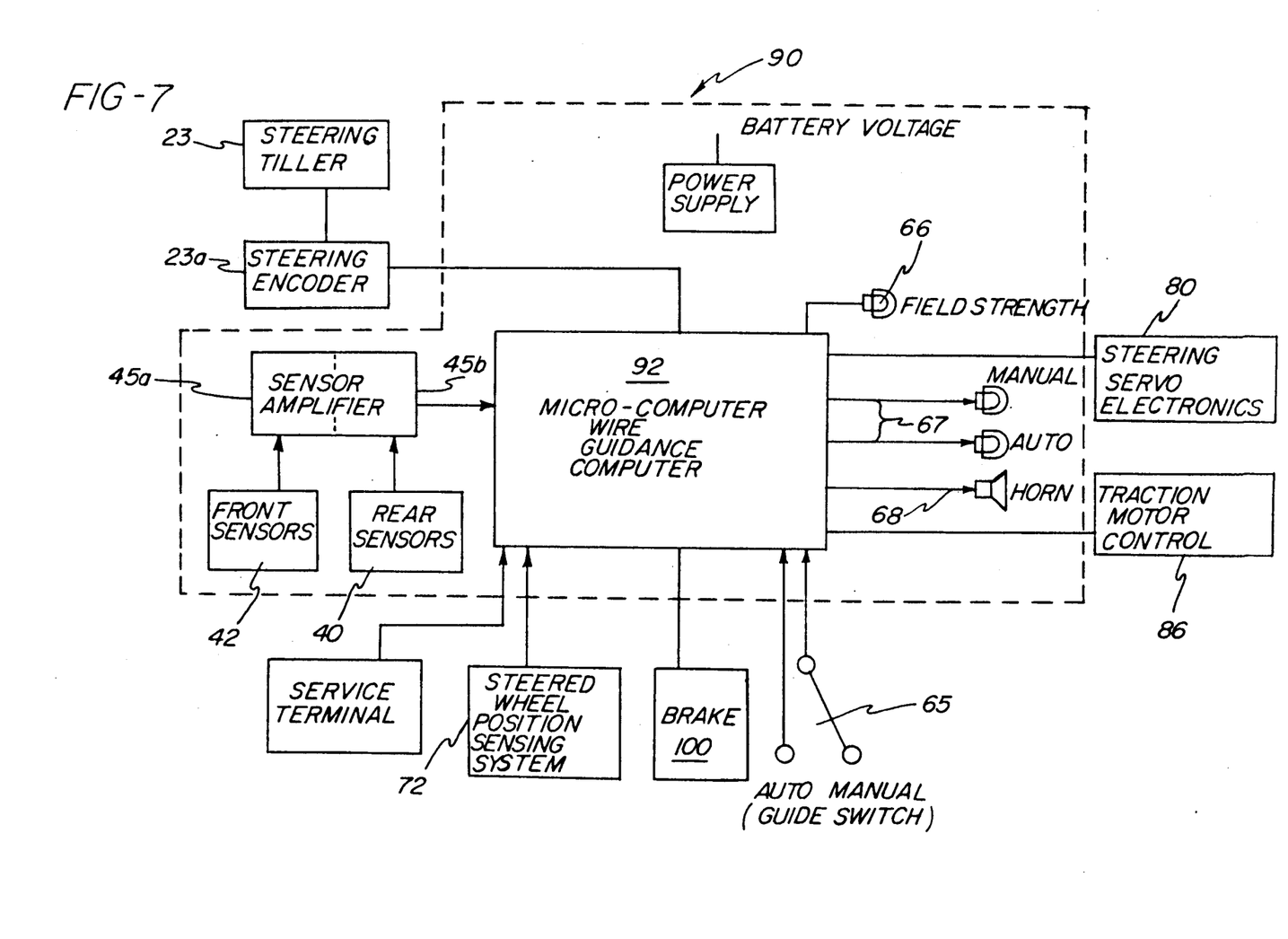
FIG. 7 is a simplified electrical block diagram showing the major components comprising of a guidance system.

The electronic components forming the present invention, are more clearly described in the block diagram of FIG. 7. A microcomputer wire guidance system 90 includes a microprocessor 92 that is provided with one input from a sensor amplifier 95, and other inputs from the steered wheel position sensor 72, the steering encoder 23a, and the guidance control switch 65. Outputs from the microcomputer 90 are provided to the traction motor control 86 for controlling the speed of the vehicle and to the steering servomotor control 80. Other outputs are provided to indicate to the operator when the vehicle is near an operating wire, that is, a wire which has the proper signal for use in a guidance system by means of the alarm horn 68 and field strength indicator light 66.

When the guidance selector switch 65 is in the manual position, the operator controls the steering of the vehicle directly by means of the steering tiller 23. When the guidance selector switch 65 is placed in the automatic position, the microcomputer 90 will automatically enter the search mode, and when either sensor 40 or 42 detects the guidance signal, the microcomputer 90 will automatically take the vehicle into an Acquisition Mode where the vehicle is guided into alignment with the wire. Once the vehicle is properly aligned, the microcomputer 90 will go into an Automatic Tracking Mode where the vehicle alignment is maintained automatically under computer control.

Figure 11:
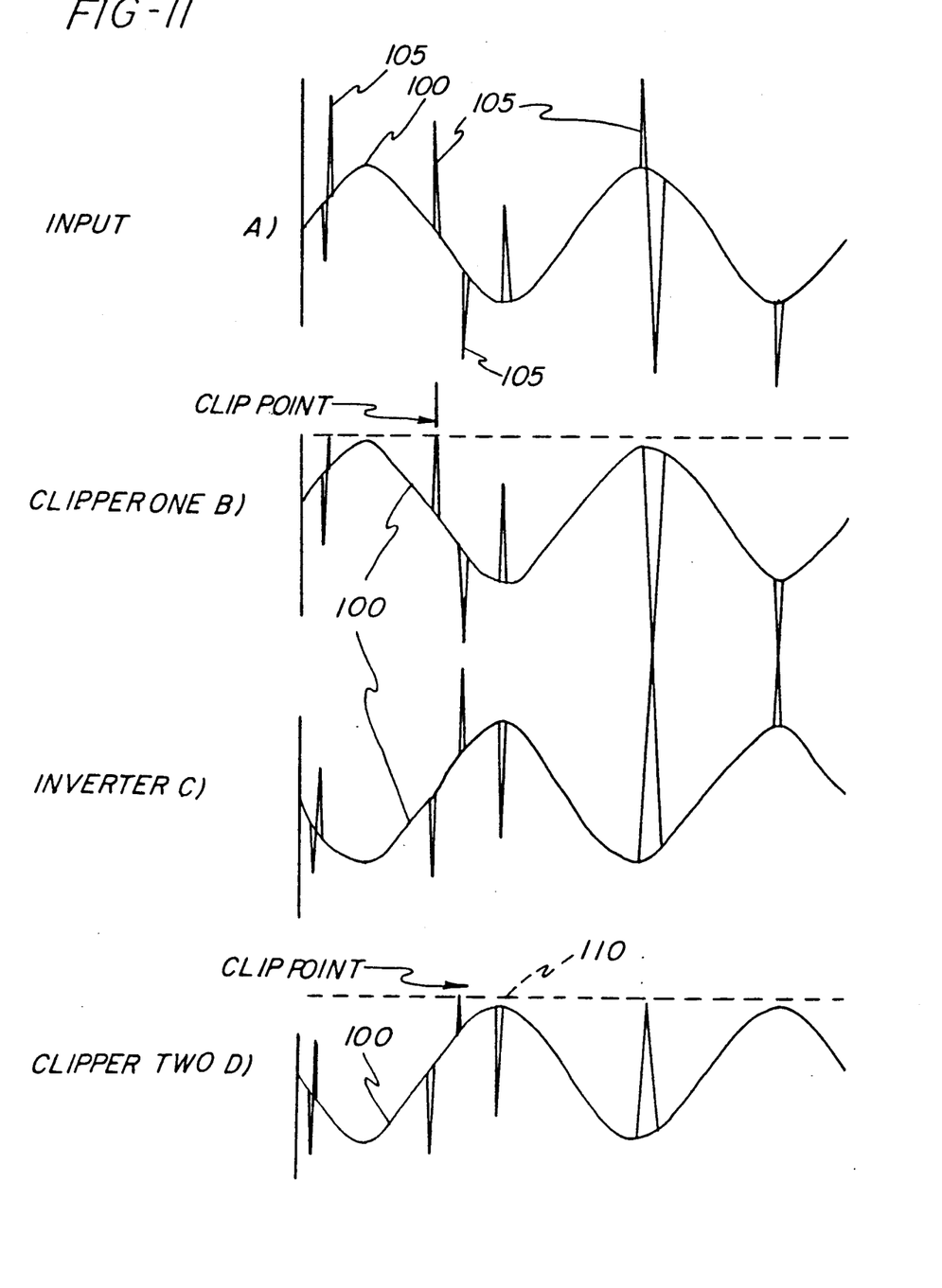

The signal radiated by the buried wire 50 and detected by the coils 60 in the sensor bars 40 and 42 is shown by the waveform 100 in FIG. 11A. The sensor coils 60, however, may also pick up spurious signals, which are represented by the spikes 105 on the sinusoidal waveform. Many of these spikes will exhibit amplitude swings in excess of the normal amplitude variation of the sinusoidal signal. The magnitude of the sinusoidal signal 100 is a function of the distance of the coil 60 from the wire 50 carrying that signal. The noise impulses 105, as illustrated in FIG. 11A, are normally of short duration and therefore do not contain significant energy, as compared to the sinusoidal signal carried by the wire 50.

Since the magnitude of the sinusoidal signal 100 is a function of the distance of the coil 60 from the wire 50, one of the objects of this invention will be to measure the amplitude of the sinusoidal signal accurately, so that the distance from the buried wire to the coil can be accurately determined, but to do this, the noise signals must be accounted for and their effect on the amplitude measurement limited to the greatest extent possible.

In the present invention, the signals detected by the sensor coils are limited by a circuit, that may be characterized as a dynamic clipper, to a value determined by a reference voltage whose value is dynamically changing, as will be described. The output of the clipper is then rectified to provide a direct current voltage which is then integrated over a period that takes into account the rate at which the sinusoidal signal will change as the vehicle approaches the wire 50. This integrated signal is both the reference signal and the output of the dynamic clipper.

Figure 8:
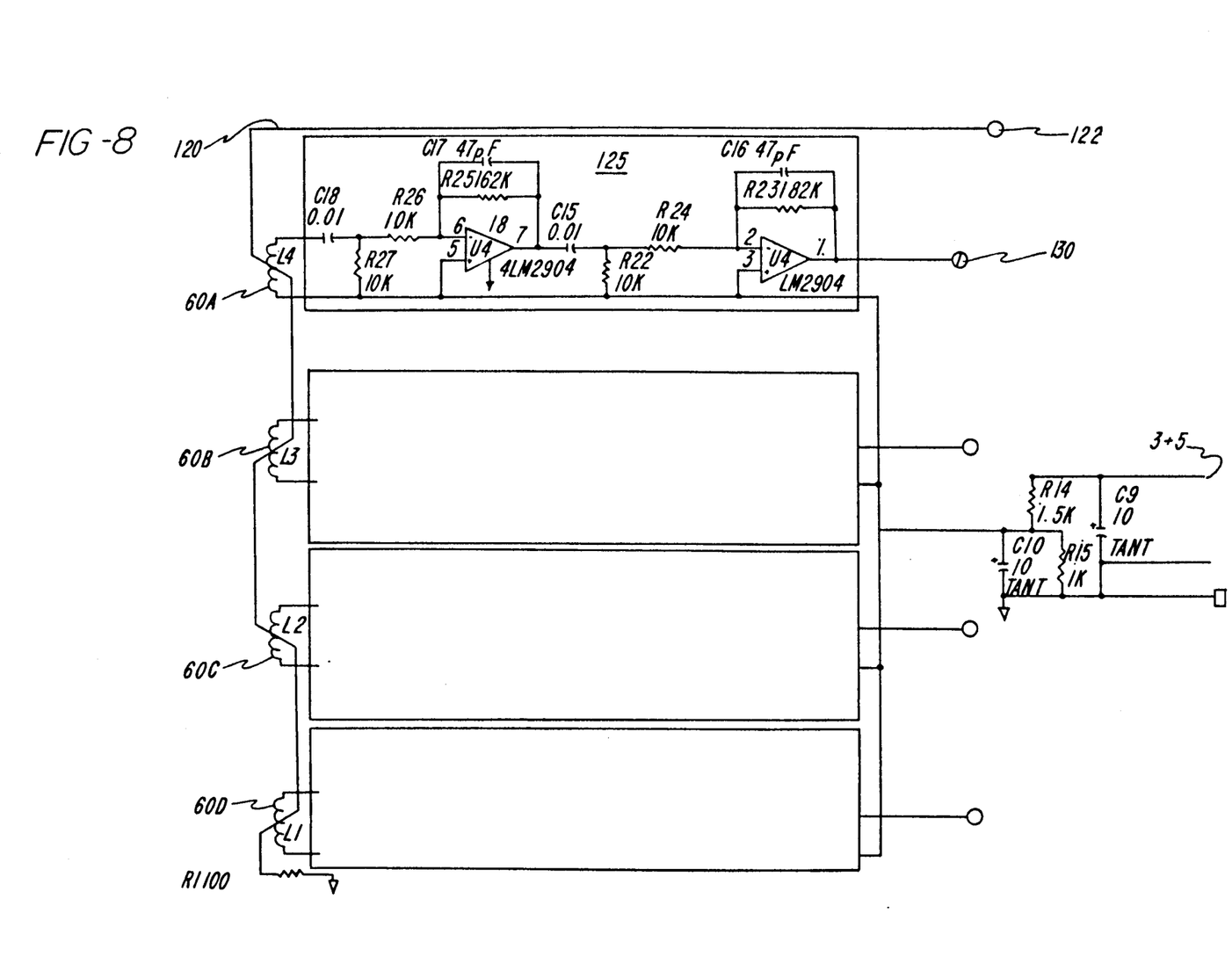
FIG. 8 is an electrical schematic diagram of the sensor bar, including the sensor coils and associated amplifiers.

In the preferred embodiment of the invention, each sensor bar is provided with four coils, 60a-60d, as shown in FIG. 8. A wire 120 passes near each of the coils and connected to a self-test terminal 122. By passing a sinusoidal current through this wire, the coils can be tested for proper operation.

Each of the coils is associated with a simple twostage amplifier 125, one of which is shown in detail in FIG. 8. Each amplifier 125 is physically located in the sensor bar itself. Identical amplifiers are associated with each of the coils in each sensor bar. The output of amplifier 125 at terminal 130 is carried by a cable from the sensor bar to the sensor amplifier 95, shown generally in FIG. 7 and in more detail in FIGS. 9 and 10.

Figure 9:
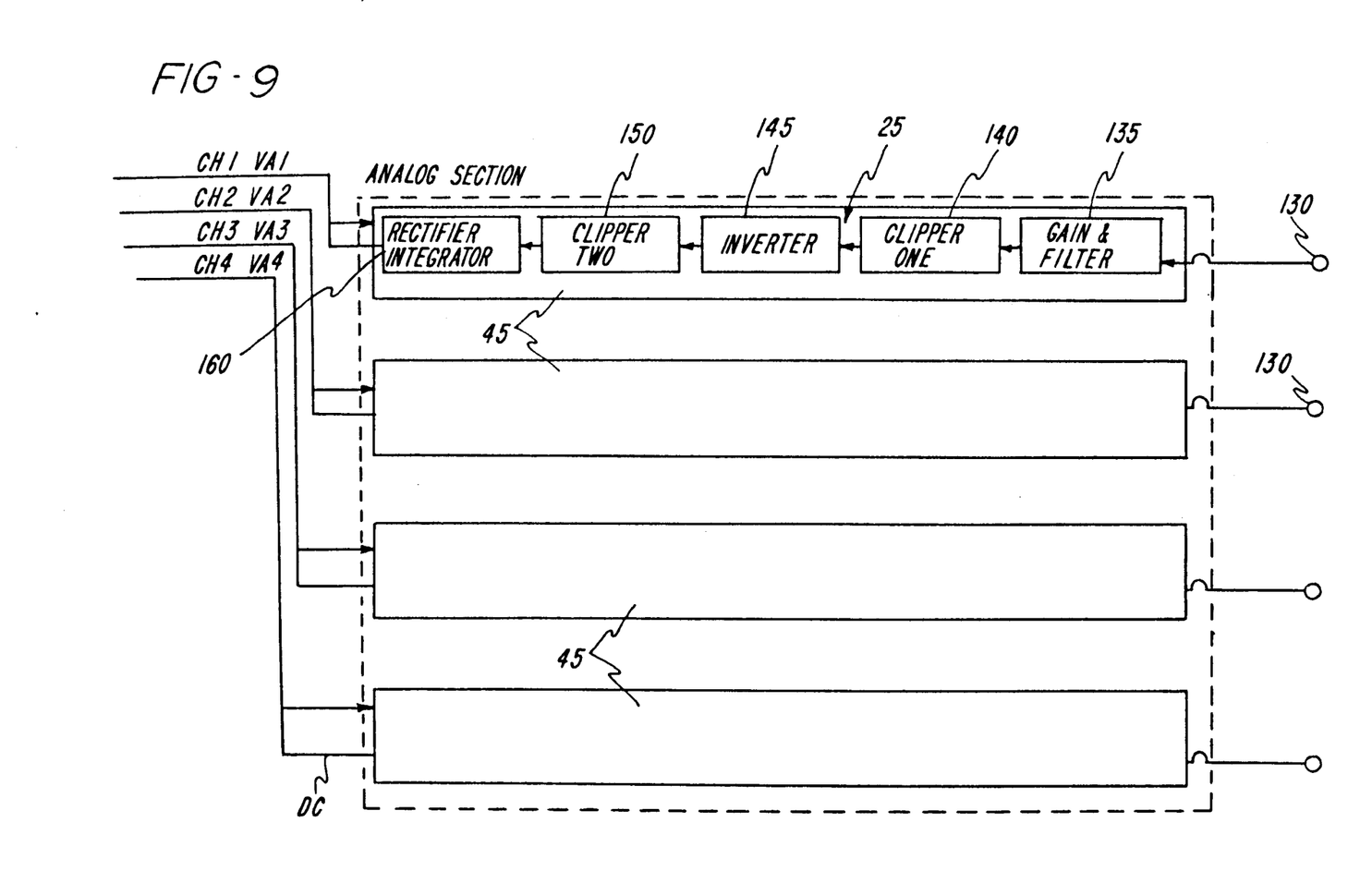
FIG. 9 is an electrical block diagram of the major elements comprising a dynamic clipper for minimizing noise pulses inductively coupled into any one of the sensor coils.
Figure 10:
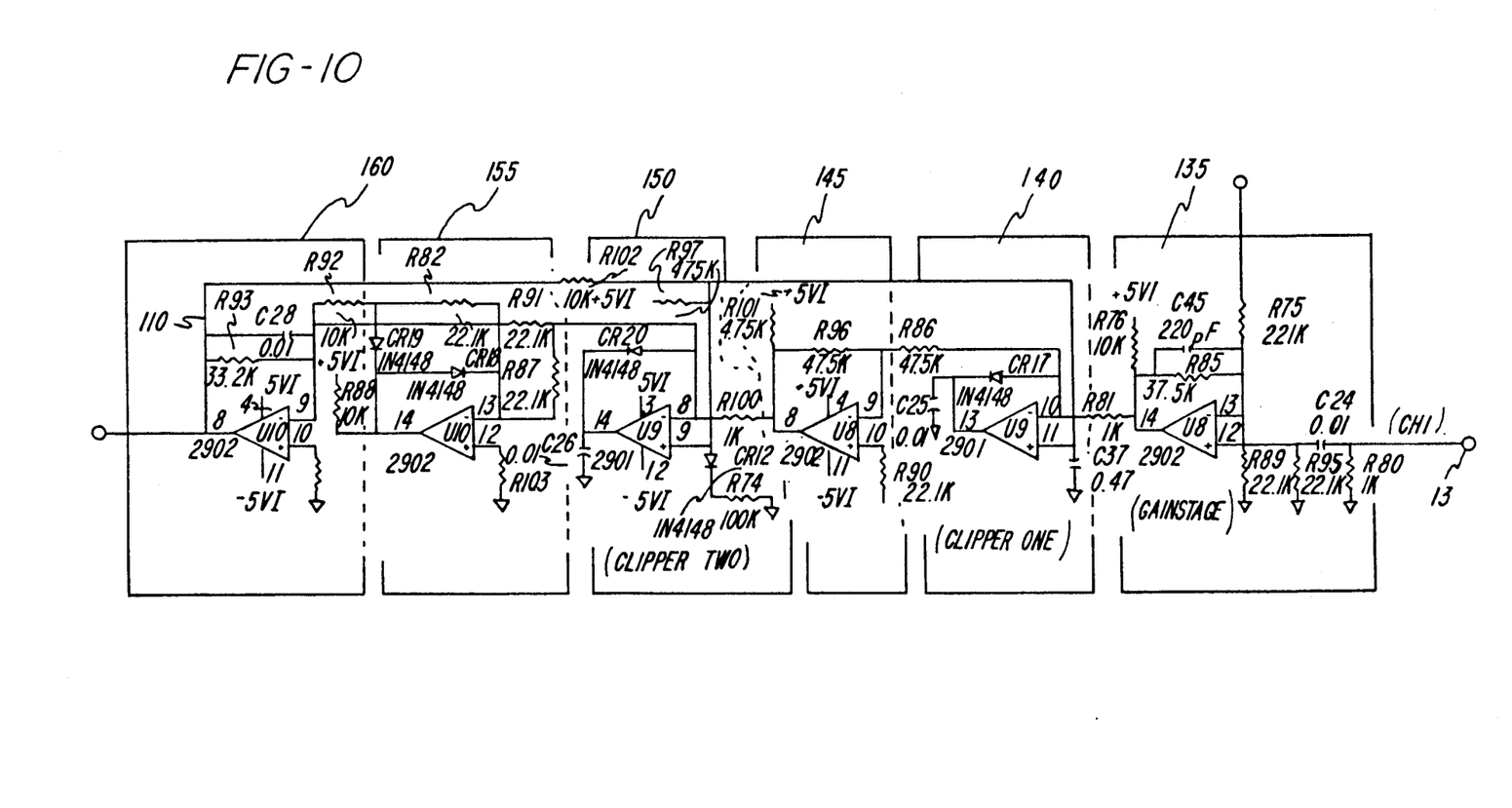
FIG. 10 is a detailed electrical schematic diagram of a dynamic clipper circuit.

The output 130 from each of the sensor bar amplifiers 125 is connected to the sensor amplifier 95 shown in FIGS. 9 and 10. This amplifier includes a gain and filter stage 135, a first clipper or comparator stage 140, an inverter circuit 145, a second clipper or comparator stage 150, a rectifier stage 155, and integrator stage 160.

The gain and filter stage 135 is a simple straightforward amplifier circuit. Capacitor C45 and resistor R85 form a filter circuit which limits the input frequency range from 4 to 12 khz. The gain of this stage is fixed at approximately 2.

The output of the gain and filter stage 135 is applied to the first clipper circuit 140 which is basically a comparator. The other input to this stage is a reference voltage. The output of this circuit is shown in FIG. 11B where any signal greater than the reference 110 is clipped or cut off. Thus, the first clipper 140 compares the magnitude of the output from the sensor coil and limits that output to a value determined by the reference voltage 110.

The output of the comparator is applied to an inverter circuit 145 which merely inverts the input signal and sends it to a second clipper or comparator stage 150. The output of the inverter is shown in FIG. 11C.

The second clipper 150 is also provided with the same reference voltage for comparison purposes. The output of this stage is thus limited to a magnitude determined by the reference voltage 110, as illustrated in FIG. 11D.

The output of the second clipper or comparator stage 150 is applied to a full wave rectifier circuit 155 which converts the sinusoidal signal to a direct current signal. The rectifier shown includes an amplifier U4 and diodes CR18 and CR19.

The output of the rectifier is applied to an integrator stage 160, including amplifier U10, capacitor C28 and resistor R93. The purpose of this stage is to integrate the small variations in the signal shown in FIG. 11D over a period of time and to provide a reasonably steady direct current voltage which is representative of the sinusoidal signal being received by the sensor coil 60 providing the input to this particular circuit, and thus the distance of the coil from the wire. This circuit has a time constant or approximately 30 milliseconds. The output of this stage is not only the output that will be utilized by the remainder of the guidance system for controlling the vehicle, but it is also the reference voltage 110 used by the clipper stages 140 and 150. Thus, this voltage dynamically changes according to the distance of the sensor coil 60 from the wire 50, but is independent of the noise impulses 105 also picked up by the sensor coil.

Because the clipper stages 140 and 150 will not permit input voltage levels greater than the reference to pass, some means must be provided to prevent the reference from dropping completely to zero. For this purpose, resistors R97 and R74 and diode CR12 are provided to cause the reference voltage 110 to start at something other than zero during initial start-up.

Thus, low energy, short duration pulses having an amplitude significantly more than the reference voltage will be ignored. The circuit therefore provides a means for allowing the voltage level from the sensor coils to increase gradually, and certainly fast enough to respond to the maximum speed of the vehicle, as it approaches or comes in close proximity to the buried wire, and an accurate measure of the distance of each coil from the wire in a dynamic manner.

The output of each integrator 160 in the sensor amplifier 95 shown in FIGS. 9 and 10 is applied to an A/D converter circuit which places the output signal in a digital format for use by the microprocessor 92.

The microcomputer 90 will sense the output of each of the sensor coils 60 individually, and by reference to a voltage level established during a calibration procedure, it will calculate the distance of the sensor coil from the buried wire. By providing a sensor coil signal that is essentially independent of noise, and which responds quickly to changes in the magnitude of the sinusoidal signal from the wire 50, this distance can be determined with a high degree of accuracy. Further, since each of the sensor bar distances from the buried wire are known, the angle at which the bar is placed relative to the wire can then be determined by straightforward trigonometry, as well as the distance of the center of the sensor bar, thus giving the wire guidance system the information it needs to control the operation of the vehicle.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a guided vehicle control system including at least one sensing coil for providing an output representative of the presence and location of a buried wire, circuit means responsive to the output of said sensing coil, and means responsive to the circuit means for controlling the direction of the vehicle, the improvement characterized by the circuit means including noise limiting means for limiting the effect of noise and other spurious signals detected by the sensing coil, said noise limiting means including voltage limiting means responsive to the output of the sensing coil for limiting the magnitude of the sensing coil voltage to a value determined by a reference voltage, rectifier means for rectifying the output of said voltage limiting means, and means for integrating the output of said rectifier means to generate said reference voltage, whereby the output of said rectifier means will be closely related to the strength of the signal induced into the sensing coil from the buried wire.

2. The guided vehicle control system of claim 1 wherein the output of the sensing coil is a sinusoidal waveform and wherein said voltage limiting means includes means for limiting both the positive and negative portions of said waveform, said means for limiting including first means for comparing the magnitude of the signal sensed by the sensing coil to said reference voltage and for limiting the output thereof to a value determined by said reference voltage, means for inverting the output of said first means second means for comparing the magnitude of the signal sensed by the sensing coil to said reference voltage and for limiting the output thereof to a value determined by said reference voltage.

3. The guided vehicle control system of claim 1 wherein said integrating means includes means for establishing a lower limit for said reference voltage.

4. The guided vehicle control system of claim 1 wherein said rectifier means is a full wave rectifier.

5. The guided vehicle control system of claim 1 wherein said reference voltage is also the output of the circuit means.

6. In a guided vehicle control system including sensing coils for providing an output representative of the presence and location of a buried wire, circuit means responsive to the output of said sensing coils, and means responsive to the circuit means for controlling the direction of the vehicle, the improvement characterized by said circuit means including means for limiting the effect of noise and other spurious signals detected by the sensing coils, said limiting means including first means for comparing the magnitude of the signal sensed by each of the sensing coils to a reference voltage and for limiting the output thereof to a value determined by said reference voltage, means for inverting the output of said first means second means for comparing the magnitude of the signal sensed by each of the sensing coils to said reference voltage and for limiting the output thereof to a value determined by said reference voltage, rectifier means for rectifying the output of said second means, and means for integrating the output of said rectifier means to provide said reference voltage, whereby the output of said rectifier means is closely related to the strength of the signal induced into the sensing coils from said buried wire.

7. The guided vehicle control system of claim 6 wherein said rectifier means is a full wave rectifier.

8. The guided vehicle control system of claim 6 wherein said first and second means limit the output thereof to no more than said reference voltage.

9. The guided vehicle control system or claim 6 wherein said integrating means includes a time constant of approximately 30 milliseconds.

10. In a vehicle guidance system having a buried wire with variable energy which is inductively coupled into a sensing coil, the improvement comprising an apparatus for limiting the effect of noise pulses picked up by the sensing coil, said apparatus including an amplifier for receiving an input signal from the sensing coil and for providing a conditioned signal, first comparator means, having a first input from said amplifier and a second input, for providing an output signal which substantially reproduces the first input signal but which does not exceed a reference signal applied to said second input by more than a predetermined amount, inverter means for inverting the output signal of said first comparator means, second comparator means, having a first input from said inverter means and a second input, for providing an output signal which substantially reproduces the first input signal but which does not exceed said reference signal applied to said second input by more than a predetermined amount, a full wave rectifier for rectifying the output of said second comparator means, an integrator connected to the output of said full wave rectifier for providing said reference signal to said second inputs of both said first and second comparator means, whereby the output from said integrator will follow variations in the amplitude of the signal from said sensing coil while ignoring substantially any spurious noise in the input signal.

11. The vehicle guidance system of claim 10 wherein said amplifier includes means for limiting the frequency response of the amplifier to a predetermined range of frequencies.

* * * * *